United States Patent Office 2,700,660
Patented Jan. 25, 1955

2,700,660

INTERPOLYMERIZATION PRODUCTS OF VINYL ISOBUTYL ETHER AND HIGHER OLEFINS

Eugen Mueller, Ludwigshafen (Rhine), Germany, assignor to Badische Anilin- & Soda-Fabrik Aktiengesellschaft, Ludwigshafen am Rhine, Germany No Drawing. Application March 29, 1951,
Serial No. 218,257

Claims priority, application Germany
April 14, 1950

8 Claims. (Cl. 260—80.5)

This invention relates to the production of interpolymers from vinylisobutyl ether and olefines containing more than 4 C-atoms and an isopropylidene group in the molecule.

It is already known that by polymerization of vinyl ethers by means of Friedel-Crafts catalysts or their addition compounds, high molecular substances are obtained which are viscous and sticky, balsam-like, waxy or resinous depending on the nature of the vinyl ether employed and on the method of polymerization. If especially pure vinyl isobutyl ether is polymerized at low temperatures, advantageously in liquid propane, for example with boron fluoride, rubber-like polymerization products are obtained having great strength and high elasticity.

I have now found that by the polymerization of mixtures of vinyl isobutyl ether and olefines having more than 4 carbon atoms and an isopropylidene group in the molecule by means of Friedel-Crafts catalysts or their addition products, as for example with water, alcohols, ethers, acids and the like, interpolymerization products having new properties are obtained, and that the said interpolymerization products may be used in admixture with high molecular oxygen-containing oily, fatty, waxy or resinous compounds, and if desired with other highly polymeric film-forming substances, as technically valuable plastic masses.

As examples of olefines having more than 4 carbon atoms and an isopropylidene group in the molecule there may be mentioned for example the following compounds:

3-methylbutene-(2)

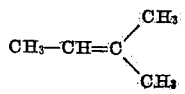

2.3-dimethylbutene-(2) (tetramethylethylene)

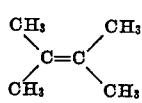

2.4-dimethylpentene-(3)

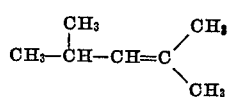

2.2.4-trimethylpentene-(3)

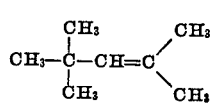

2.2.4-trimethyl-3-tertiarybutylpentene-(3)

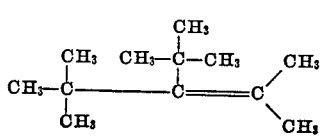

2.6-dimethyl-4-isopropylideneheptane

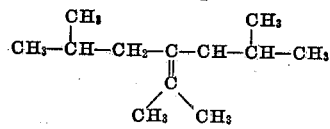

For carrying out the interpolymerization it is not necessary that the polymerizable olefines should be present in pure form, but mixtures of the same with each other and/or with other non-reactive olefines may be employed. Where there is too small a proportion of polymerizable compounds, however, an enrichment, for example by fractionation, is advantageous.

As suitable mixtures of olefines there may be mentioned for example di-isobutylene and tri-isobutylene which may be obtained by polymerization of isobutylene in known manner. Different stereo-isomers are thus formed as mixtures. The individual fractions of these mixtures of isomers behave somewhat differently in the polymerization with vinyl isobutyl ether. Thus in an interpolymerization product with vinyl isobutyl ether, a fraction of di-isobutylene which boils between 103° and 106° C. gives the same effect in a proportion of 10 to 15% (6.4 to 10 moles of vinyl isobutyl ether per mole of di-isobutylene) as the unfractionated di-isobutylene in a proportion of 20 to 25%.

Other suitable olefinic mixtures are for example:

(I) A C₅-olefine mixture consisting to the extent of about 50% of 3-methylbutene-(2) (see formula above) and to the extent of about 50% of 3-methylbutene-(3)

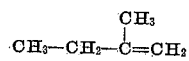

(II) A C₆-olefine mixture having a content of about 61% of 2.3-dimethylbutene-(2) (see formula above) and about 7.5% 4-methylpentene-(3)

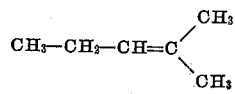

(III) A C₇-olefine mixture with a content of about 70% of 2.4-dimethylpentene-(3) (see formula above) and about 30% of 2.4-dimethylpentene-(1).

The polymerization is generally speaking carried out at the lowest possible temperature; it is preferable to work at about —45° to —70° C. and to polymerize in a solvent which is caused to boil by the heat of polymerization set free, whereby the heat of polymerization can be conveniently withdrawn. Suitable solvents are for example liquid propane, propylene or mixtures of the same. The polymerization usually takes place at the moment of adding the polymerizing agent, as for example boron fluoride. It has been found to be advantageous from the point of view of yield and quality, however, not to allow the polymerization to be completed too rapidly, preferably by not introducing the whole of the necessary amount of catalyst, as for example boron fluoride, at once, but by leading only a weak current of boron fluoride into the solution. When the reaction has been completed, it is preferable to add water to the reaction mixture in order to drive off the residual amounts of solvent, and to destroy the polymerization catalyst by the addition of ammonia. There is thus obtained a spongy mass which feels like wash-leather and which may readily be plucked apart into flocks or cut into chips or shreds. The polymer is washed with water, preferably by squeezing it out in comminuted form several times like a sponge and then allowing it to fill again by suction. The flocks or shreds thus pressed together fall apart again by reason of their elasticity. The mass is then dried, preferably in a current of air at 50° to 60° C.

The interpolymers obtained, contrasted with pure polyvinyl isobutyl ether, melt within a comparatively short temperature interval. Although they melt at lower temperature than polyvinyl isobutyl ether, they are free from stickiness. This property enables them to be used as plastic masses in cases in which polyvinyl isobutyl ether is less suitable on account of its tendency to stick; consequently plastic masses capable of a great variety of industrial applications may be prepared from said interpolymers.

The following examples will further illustrate this invention but the invention is not limited to these examples. The parts are by weight.

*Example 1*

350 parts of liquid propane are added to 80 parts of highly purified vinyl isobutyl ether and 20 parts of di-isobutylene (4.5 moles of vinyl isobutyl ether per mole of di-isobutylene) having a boiling point of 101° to 103° C. Into the mixture cooled to −60° C., boron fluoride is led in a weak current. As soon as the polymerization has been initiated, which becomes evident by vigorous boiling of the reaction mixture, the introduction of boron fluoride is interrupted. Towards the end of the polymerization, which is reached after about 30 to 45 seconds and which can be detected by subsidence of the vigorous boiling, boron fluoride is again led in for about 5 seconds. A viscous, gluey, colourless mass remains in the reaction vessel. Water is poured onto this. Vigorous evaporation of propane takes place and the polymerizate swells up very strongly to a white, non-sticky mass which can be readily torn apart. In some cases, after pouring on the water, the polymerizate is obtained in the form of small flakes instead of a coherent mass. If it is formed as a coherent mass, this is comminuted by tearing or cutting, placed in water and ammonia is added to destroy the remainder of the catalyst. After washing several times with fresh water, the polymerizate is dried in a current of air at about 55° C. It has a K-value of 83 and melts at 74° to 78° C.

*Example 2*

75 parts of vinyl isobutyl ether and 25 parts of tri-isobutylene (5 moles of vinyl isobutyl ether per mole of tri-isobutylene) having a boiling point of 176° to 178° C. are polymerized under the conditions specified in Example 1. The polymerizate obtained differs from that obtained in Example 1 by a somewhat greater elasticity, a higher K-value and a higher melting point. The K-value is 90 and the melting point 85° to 90° C.

*Example 3*

350 parts of liquid propane are added to 85 parts of vinyl-isobutyl ether and 15 parts of an olefine mixture (II) containing about 61% of 2.3-dimethylbutene-(2) and 7.5% of 4-methylpentene-(3) (7 moles of vinyl isobutyl ether per mole of the named olefines) and polymerization is effected as described in Example 1. The polymerizate obtained after working up has a K-value of 82 and a melting point of 70° to 75° C.

*Example 4*

85 parts of vinyl isobutyl ether and 15 parts of an olefine mixture (III) containing about 70% of 2.4-dimethylpentene-(3) (8 moles of vinyl isobutyl ether per mole of 2.4-dimethylpentene-(3)) is polymerized in liquid propane as described in Example 1. The polymerizate obtained has a K-value of 85 and a melting point of 73° to 78° C.

What I claim is:
1. A process for the production of interpolymers which comprises polymerizing in relative proportions of about 4.5 to about 10 moles of vinyl isobutyl ether with 1 mole of an olefine from the group consisting of 2,4-dimethylpentene-3, diisobutylene and triisobutylene at subatmospheric temperatures in the presence of a catalyst from the group consisting of Friedel-Crafts catalysts and the water, alcohol, ether and acid addition products thereof.
2. A process for the production of interpolymers which comprises polymerizing in relative proportions of about 4.5 to about 10 moles of vinyl isobutyl ether with 1 mole of an olefine from the group consisting of 2,4-dimethylpentene-3, diisobutylene and triisobutylene at temperatures between about −45° C. and −70° C. in the presence of a catalyst from the group consisting of Friedel-Crafts catalysts and the water, alcohol, ether and acid addition products thereof.
3. A process for the production of interpolymers which comprises polymerizing in relative proportions of about 4.5 to about 10 moles of vinyl isobutyl ether with 1 mole of diisobutylene at temperatures between about −45° C. and −70° C. in the presence of a boron fluoride catalyst, and recovering the polymer.
4. Elastic, non-sticky, rubber-like interpolymers comprising recurring vinyl isobutyl ether molecules and molecules of olefines from the group consisting of 2,4-dimethylpentene-3, diisobutylene and triisobutylene, such interpolymers containing about 4.5 to about 10 moles of said ether per mole of said olefines.
5. Elastic, non-sticky, rubber-like interpolymers comprising recurring vinyl isobutyl ether groups and diisobutylene groups, said interpolymers containing about 4.5 to about 10 moles of said ether per mole of di-isobutylene.
6. Elastic, non-sticky, rubber-like interpolymers comprising recurring vinyl isobutyl ether groups and tri-isobutylene groups, said interpolymers containing about 4.5 to 10 moles of said ether per mole of tri-isobutylene.
7. Elastic, non-sticky, rubber-like interpolymers comprising recurring vinyl isobutyl ether groups and 2,4-dimethylpentene-3 groups, said interpolymers containing about 4.5 to 10 moles of said ether per mole of 2,4-dimethylpentene-3.
8. Elastic, non-sticky, rubber-like interpolymers comprising recurring vinyl isobutyl ether groups, 2,3-dimethylbutene-2 groups and 4-methylpentene-3 groups, said interpolymers containing about 4.5 to 10 moles of said ether per mole of 2,3-dimethylbutene-2 and 4-methylpentene-3.

References Cited in the file of this patent

UNITED STATES PATENTS

| | | |
|---|---|---|
| 2,061,934 | Cunradi | Nov. 24, 1936 |
| 2,513,820 | Schildknecht | July 4, 1950 |
| 2,565,960 | Carber et al. | Aug. 28, 1951 |

FOREIGN PATENTS

| | | |
|---|---|---|
| 486,097 | Canada | Aug. 26, 1952 |